(12) United States Patent
Amerson et al.

(10) Patent No.: US 9,932,278 B2
(45) Date of Patent: Apr. 3, 2018

(54) GRANULATOR FEED APPARATUS

(71) Applicant: AdvanSix Resins & Chemicals LLC, Parsippany, NJ (US)

(72) Inventors: Edwin J. Amerson, Chesterfield, VA (US); Craig T. Euen, Chester, VA (US); William D. Batterton, Ripon, CA (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 69 days.

(21) Appl. No.: 15/047,057

(22) Filed: Feb. 18, 2016

(65) Prior Publication Data

US 2016/0264481 A1  Sep. 15, 2016

Related U.S. Application Data

(60) Provisional application No. 62/132,109, filed on Mar. 12, 2015.

(51) Int. Cl.
  *C05C 1/02* (2006.01)
(52) U.S. Cl.
  CPC ............... *C05C 1/02* (2013.01); *Y02W 30/43* (2015.05)
(58) Field of Classification Search
  CPC ........... C05C 1/02; C05C 3/005; Y02W 30/43
  See application file for complete search history.

(56) References Cited

U.S. PATENT DOCUMENTS

| | | | |
|---|---|---|---|
| 2,795,495 A | 6/1957 | Schmatloch et al. | |
| 3,726,660 A | 4/1973 | Drechsel et al. | |
| 3,852,055 A | 12/1974 | Hawkes et al. | |
| 3,956,464 A | 5/1976 | Drechsel et al. | |
| 3,964,893 A | 6/1976 | Everingham et al. | |
| 4,268,490 A | 5/1981 | Neville | |
| 4,512,793 A | 4/1985 | Harrison | |
| 4,604,126 A | 8/1986 | Moraillon | |
| 4,758,261 A * | 7/1988 | Parker | C01B 25/28 71/34 |
| 6,361,720 B1 | 3/2002 | Highsmith | |
| 6,454,828 B1 | 9/2002 | Lohry et al. | |
| 6,689,181 B2 | 2/2004 | Highsmith et al. | |
| 7,175,684 B1 | 2/2007 | Kweeder et al. | |

(Continued)

FOREIGN PATENT DOCUMENTS

| | | |
|---|---|---|
| EP | 1595860 A2 | 11/2005 |
| EP | 1923376 A2 | 5/2008 |

(Continued)

OTHER PUBLICATIONS

Ando et al., Compounds in Mixed Nitrate Fertilizers and their Behavior, Faculty of Science and Engineering, Chuo University,Tokyo, Dispatch No. 462216 (Accepted Apr. 5, 1974), pp. 1-15 with notation to Nippon Kagakukaishi, 1974, (9), p. 1617-1622.

(Continued)

*Primary Examiner* — Jennifer A Smith
(74) *Attorney, Agent, or Firm* — Faegre Baker Daniels LLP

(57) ABSTRACT

Embodiments of the present disclosure include systems and methods of producing granulated fertilizer products. In some embodiments, the granulated fertilizer product includes a double salt of ammonium nitrate and sulfate nitrate having the formula $NH_4SO_4 \cdot 2(NH_4NO_3)$.

20 Claims, 2 Drawing Sheets

(56) References Cited

U.S. PATENT DOCUMENTS

| | | |
|---|---|---|
| 7,985,393 B2 | 7/2011 | Smith |
| 8,075,660 B2 | 12/2011 | Kweeder et al. |
| 2002/0095966 A1 | 7/2002 | Highsmith et al. |
| 2007/0199357 A1 | 8/2007 | Kweeder et al. |
| 2009/0173124 A1 | 7/2009 | Kononov et al. |
| 2010/0047149 A1 | 2/2010 | Stevens et al. |
| 2010/0242556 A1 | 9/2010 | Smith |
| 2012/0131972 A1 | 5/2012 | Kweeder et al. |
| 2013/0192323 A1 | 8/2013 | Barthe et al. |

FOREIGN PATENT DOCUMENTS

| | | |
|---|---|---|
| GB | 1259778 A | 1/1972 |
| WO | 2002006186 A1 | 1/2002 |
| WO | 2002040427 A2 | 5/2002 |
| WO | 2010008987 A2 | 1/2010 |
| WO | 2013116024 A1 | 8/2013 |

OTHER PUBLICATIONS

Ando, "Increase in Weight and Degradation of Granulated Fertilizer Compounds Containing Nitrates and Sulfates", Sep. 23-27, 1974, LSMA Technical Meeting, Prague Czechoslovakia.

Bahl et al., The Ternary System. Ammonium Nitrate-Ammonium Sulphate-Water at 25°. Journal of the Indian chemical Society, vol. XVIII (1941) pp. 307-308.

Extended European Search Report issued in EP Application No. 13742876.9, dated Nov. 19, 2015, 7 pages.

International Search Report and Written Opinion issued in PCT/US2013/022373, dated May 15, 2013, 8 pages.

\* cited by examiner

GRANULATOR FEED APPARATUS

CROSS-REFERENCE TO RELATED APPLICATIONS

This application claims the benefit under Title 35, U.S.C. §119(e) of U.S. Provisional Application Ser. No. 62/132,109 entitled GRANULATOR FEED APPARATUS, filed on Mar. 12, 2015, the entire disclosure of which is expressly incorporated by reference herein.

FIELD

The present invention relates to apparatus and methods for granulators, and in particular granulators for producing fertilizer products.

BACKGROUND

Ammonium sulfate nitrate (ASN), one of the first synthetic fertilizers, has been in continuous use for nearly 100 years providing the important primary and secondary nutrients, nitrogen and sulfur. Nitrogen is provided in part through the nitrate ion, desirable because it is readily absorbed by many plants and promotes early growth.

Exemplary ASN fertilizers include double salts of ammonium nitrate and ammonium sulfate having the formula $NH_4SO_4.2(NH_4NO_3)$ (known as a 2:1 double salt) and $NH_4SO_4.3(NH_4NO_3)$ (known as a 3:1 double salt), such as disclosed in U.S. Pat. No. 6,689,181, which is incorporated herein by reference in its entirety. The term "double salt" as used herein means a chemical compound composed of ions from two precursor compounds whose crystal structure is distinct from those of the precursor compounds. The molar ratio of precursor compounds in a double salt is in the proportion of small integers, e.g., 1:2, and is not continuously variable as in a solid solution. Thus, the term "double salt of ammonium nitrate" means a combination of ammonium nitrate and another compound, such as ammonium sulfate, in such a way as to form new compound which may be crystallographically distinct from either of the constituents. Additional double salt compositions are disclose in U.S. Pat. Nos. 8,075,660, 8,721,760, and 8,814,977, the disclosures of which are incorporated herein by reference in their entirety.

A double salt of ammonium nitrate and ammonium sulfate consists of small ammonium sulfate crystals imbedded in a matrix of the other constituents. A double salt is to be distinguished from a mixture of free particles. The bulk of the ammonium sulfate crystals are approximately the same size as the initial ammonium sulfate particles, but upon solidification about 5 wt. % precipitate as crystals of less than about 2 micrometer dimension. The crystals of ammonium sulfate are dispersed in the matrix in a uniform manner. The small size and uniform dispersion of the ammonium sulfate crystals in the 1:2 double salt significantly enhance the stability of the product against detonation hazard. The '181 patent recognized the benefit of the 2:1 double salt as being a more stable compound. The 2:1 double salts are useful as fertilizers, have reduced moisture sensitivity, are not considered hazardous materials under Title 49 of the Code of Federal Regulations, "Transportation", Part 172, "Hazardous Materials Table", Oct. 1, 2000, and are not classified as oxidizers under United Nations Recommendations on the Transport of Dangerous Goods, Manual of Tests and Criteria, 1995", "Section 34, Classification Procedures, Test Methods and Criteria Relating to Oxidizing Substances of Division 5.1". Additional examples of methods of producing 2:1 double salts are provided in U.S. Pat. No. 8,623,315, which is also incorporated by reference herein in its entirety.

ASN fertilizers are generally produced by granulation of ammonium sulfate (AS) solids with ammonium nitrate (AN) liquors. Exemplary granulation methods are disclosed in U.S. Patent Application Publication No. 2013/0192323, which is incorporated herein by reference in its entirety. Alternatively, ASN fertilizers may be processed as a melt slurry from either the constituent fertilizers (ammonium nitrate and ammonium sulfate) or, alternatively, from the reaction products of sulfuric/nitric acids with anhydrous ammonia. There are several alternatives for converting the melt slurry into solid fertilizer particles with the physical properties desired by various markets.

Prilling is a process in which a liquid melt is gently streamed from the top of a tall structure with counter-current cooling air. Surface tension divides the stream into individual droplets which solidify before reaching the tower bottom. An illustrative example of prilling may be found in U.S. Pat. No. 7,175,684, which is incorporated by reference herein in its entirety.

Pastillation is similar to prilling in that the melt is converted to a droplet and then solidified. However, it differs from prilling in two distinct aspects. First, rather than relying on surface tension to size the droplets, the droplets are portioned mechanically thus achieving very high uniformity in size. Second, rather than dropping the droplet through cooling air, the droplet is applied to a water-cooled metal belt. The heat is removed through the belt and solidified particles fall off the belt at its end. An illustrative example of pastillation may be found in U.S. Pat. No. 7,985,393, which is incorporated by reference herein in its entirety.

In one type of granulation process, a melt slurry is sprayed onto a moving bed of granules. The melt slurry both coats and agglomerates bed granules to increase in size. In some embodiments, the granules are discharged to a dryer drum which, if included, provides additional rolling time for the granules. The granules pass to a screening operation where the product cut is recovered and the under-sized and over-sized material is recycled back to the granulation drum.

SUMMARY

Embodiments of the present disclosure include systems and methods of producing granulated fertilizer products. In some embodiments, the granulated fertilizer product includes a double salt of ammonium nitrate and sulfate nitrate having the formula $NH_4SO_4.2(NH_4NO_3)$.

In some embodiments, the disclosure relates to a method of producing a granulated fertilizer product. The method includes providing a melt slurry, mixing an inert fluid with the melt slurry to form a mixture, spraying the mixture in a granulation bed of a granulation drum; and solidifying the melt slurry in the granulation drum to form a granulated fertilizer product.

In one more particular embodiment, the melt slurry comprises ammonium nitrate and ammonium sulfate, and wherein the product includes a double salt of ammonium nitrate and ammonium sulfate having the formula NH4SO4.2(NH4NO3). In an even more particular embodiment, at least 50 wt. % of the product consists of the $NH_4SO_4.2(NH_4NO_3)$ double salt. In another more particular embodiment, less than about 7 wt. % of the product consists of unreacted and underreacted ammonium nitrate and the $NH_4SO_4 \cdot 3(NH_4NO_3)$ double salt. In still another more particular embodiment, the melt slurry comprises a molar ratio of ammonium nitrate to ammonium sulfate of about 0.9:1 to about 1.1:1. In yet still another more particular embodiment, the product comprises granules having a water content from about 0.4 wt. % to about 2.0 wt. %. Another more particular embodiment, the granulation bed is maintained at a temperature from about 80° C. to about 120° C.

In another more particular embodiment of any of the above embodiments, the weight fraction of granules exiting the granulation drum retained on a +10 Tyler mesh screen is 35 wt. % or greater. In another more particular embodiment of any of the above embodiments, the granules exiting the granulation drum have a crush strength of 8 pounds per granule or greater.

In another more particular embodiment of any of the above embodiments, the inert fluid is a volatile fluid, and the granulated fertilizer product does not wholly include the volatile fluid. In another more particular embodiment of any of the above embodiments, the inert fluid is selected from the group consisting of: steam, liquid water, air, nitrogen, and argon. In another more particular embodiment of any of the above embodiments, the inert fluid is steam. In another more particular embodiment of any of the above embodiments, the inert fluid is liquid water. In another more particular embodiment of any of the above embodiments, the inert fluid is compressed air. In another more particular embodiment of any of the above embodiments, the inert fluid has an atmospheric boiling point of about 110° C. or less.

In another more particular embodiment of any of the above embodiments, the inert fluid is provided at an amount, based on the weight of the melt slurry, of from about 0.01 wt. % to ratio to about 20 wt. %. In another more particular embodiment of any of the above embodiments, the inert fluid is provided at an amount, based on the weight of the melt slurry, of from about 0.01 wt. % to ratio to about 0.03 wt. %. In another more particular embodiment of any of the above embodiments, the inert fluid is provided at an amount, based on the weight of the melt slurry, of from about 4 wt. % to ratio to about 20 wt. %.

In another more particular embodiment of any of the above embodiments, the method further includes measuring at least one property of the melt slurry with at least one instrument, wherein said mixing step is performed after said measuring step. In another even more particular embodiment, said measuring includes measuring at least one property selected from the group consisting of flow rate, pressure, and temperature.

In another more particular embodiment of any of the above embodiments, said mixing is performed by injecting the inert fluid into the melt slurry at an injection location in a conduit of the granulation drum. In an even more particular embodiment, the injection location is a header or a distributor of the granulation drum.

In another more particular embodiment of any of the above embodiments, said mixing is performed by injecting the inert fluid into the melt slurry at an injection location in a conduit prior to entering the granulation drum. In another more particular embodiment of any of the above embodiments, the injection point is positioned proximate a coupling between the conduit and the granulation drum.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION

Although the embodiments discussed below pertain primarily to solid ASN materials, similar techniques could be applied to other granulation products, including, without limitation, ammonium nitrate, ammonium sulfate, and urea products. In addition, although the embodiments discussed below pertain primarily to materials produced by continuous granulation processes, similar techniques could be applied to prilling or pastillation processes. As used herein, the term "solidification device" encompasses any type of device in which a melt slurry may be solidified, with non-limiting examples of solidification devices including granulation devices, prilling devices, and pastillation devices.

Figure 1:
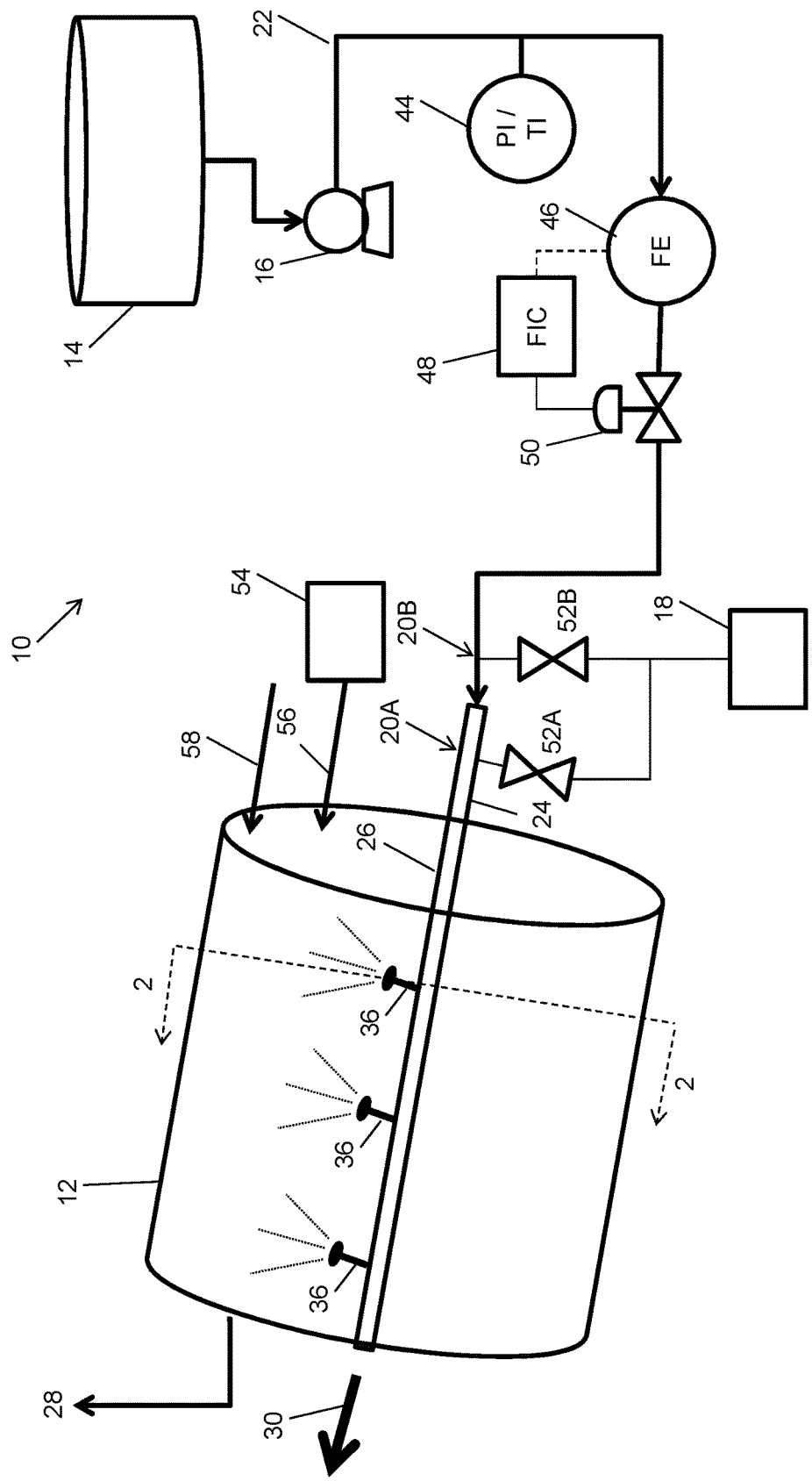
FIG. 1 is a schematic illustration of an exemplary granulation process.

FIG. 1 provides a schematic view of an illustrative but non-limiting embodiment of a granulation system 10. As illustrated, the granulation system 10 includes a granulation drum 12. Melt slurry is provided from a feed preparation vessel 14 though a pump 16 through conduit 22. In one embodiment, granulation system 10 may further include one or more of a dryer/cooler drum, a screener, and a crusher (not shown). In one embodiment, the granulation system is configured as a loop in order to recycle off-specification (i.e., oversized and/or undersized) material back to the granulation drum 12 until it is brought into target specifications. It will be appreciated that granulation configurations can include a variety of different equipment types, configurations, sizes and operating parameters.

In some embodiments, the melt slurry is formed by combining particles of ammonium nitrate and ammonium sulfate in the presence of a small amount of water, and heating to a temperature sufficient to melt the ammonium nitrate and mixing thoroughly to disperse the solid ammonium sulfate. In some embodiments, the melt slurry comprises a molar ratio of ammonium nitrate to ammonium sulfate of about 0.9:1 to about 1.1:1. The particle size of the ammonium nitrate is not critical but in some embodiments, about 95 wt. % of the ammonium nitrate particles pass a Tyler No. 6 sieve (3.36 mm opening). With respect to the ammonium sulfate, the smaller the particle, the more rapid the reaction between the ammonium sulfate and ammonium nitrate and the finer will be the scale of their dispersion. In some embodiments, the ammonium sulfate is at least about 85 wt. % passable through a Tyler No. 48 sieve (0.30 mm opening). Ammonium sulfate subjected to commercial ball milling typically meets this criterion without additional screening. In some embodiments, the ammonium sulfate is about 99 wt. % passable through a Tyler No. 48 sieve. In other embodiments, the ammonium sulfate is about 99 wt. % passable through a Tyler No. 48 sieve and about 50 wt. % passable through a Tyler No. 200 sieve (0.074 mm opening).

The properties of the melt slurry in conduit 22 may be monitored by one or more sensing and control instruments. Exemplary instruments include pressure and/or temperature instruments 44, and flow element 46. An exemplary flow element includes a Coriolis-type flow meter. Flow element 46 may be operatively coupled to a controller 48. Controller 48 is operatively coupled to a valve 50 controlling the flow rate of melt slurry through conduit 22.

In one embodiment, the granulation drum 12 is operated to produce granules having a water content of as low as about 0.4 wt. %, as low as about 0.5 wt. %, or as low as about 0.6 wt. % and as high as about 1.5 wt. %, as high as about 1.75 wt. %, or as high as about 2.0 wt. %. In other embodiments, the resulting solid ASN composition has a water content that is within any range defined between any pair of the foregoing values, such as about 0.4 wt. % to about 2.0 wt. %, about 0.5 wt. % to about 1.75 wt. %, or about 0.5 wt. % to about 1.5 wt. %. In some embodiments, the granule bed is maintained at a temperature as low as about 80° C., as low as about 85°, as low as about 90° C., or as low as about 95° C. and as high as about 100° C., as high as about 105° C., as high as about 110° C. or as high as about 120° C. In other embodiments, the granule bed is maintained at a temperature that is within any range defined between any pair of the foregoing values, such as about 80° C. to about 120° C., about 85° C. to about 110° C., or about 90° C. to about 100° C. These temperatures are significantly below the melting temperature of the ASN material. In some embodiments, the temperature of the granulation bed is determined using a temperature sensing probe having an active element submerged in the moving solids. In contrast, conventional granulation processes operate at a bed temperature of 140-160° C., which is much closer to the melting temperature of the ASN material resulting in production of granules with a water content generally below 0.4 wt. %.

In one exemplary embodiment, the weight fraction of granules exiting the granulation drum 12 retained on a +10 Tyler mesh screen is as little as 35 wt. %, 40 wt. %, 50 wt. %, as great as 55 wt. %, 60 wt. %, 65 wt. %, 70 wt. %, or greater, or within any range defined between any two of the foregoing values, such as 35 wt. % or greater, 50 wt. % or greater, or 40 wt. % to 70 wt. %.

In one exemplary embodiment, the granules exiting the granulation drum 12 have a crush strength as little as 5 pounds per granule, 6 pounds per granule, 7 pounds per granule, as great as 8 pounds per granule, 10 pounds per granule, 15 pounds per granule, or higher, or within any range defined between any two of the foregoing values, such as 5 pounds per granule or greater, 8 pounds per granule or greater, 6 pounds per granule to 15 pounds per granule, or 8 pounds per granule to 15 pounds per granule.

Figure 2:
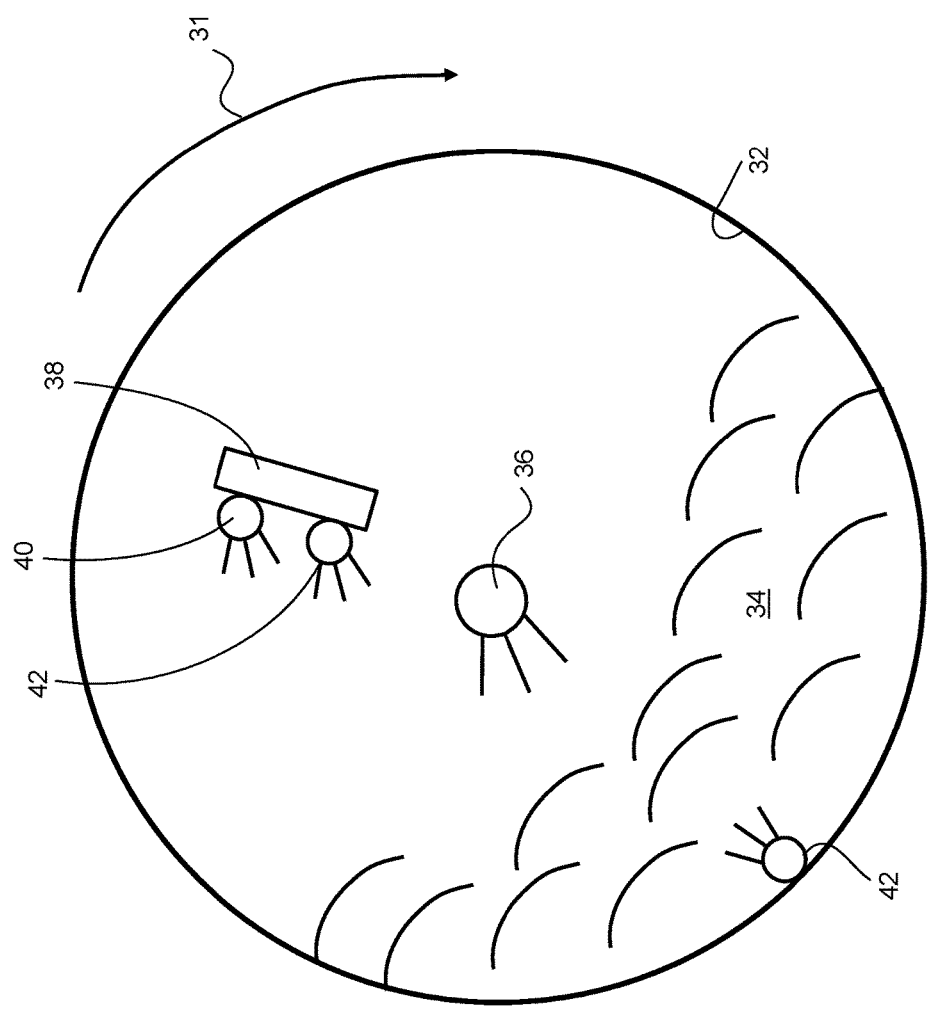
FIG. 2 is a cross-section of a granulation drum useful in an embodiment of the granulation process of FIG. 1.

FIG. 2 is a cross-sectional view of the granulation drum 12, taken along line 2-2 of FIG. 1, illustrating internal components of the granulation drum 12. In the illustrated orientation, the granulation drum 12 rotates in a direction indicated by an arrow 31. The granulation drum 12 has an inner surface 32 and contains a quantity of granules 34.

The granulation drum 12 includes one or more melt slurry spray nozzles 36 that are arranged and configured to spray the granules 34 with fresh melt slurry from inlet conduit 26. While a single melt slurry spray nozzle 36 is illustrated in FIG. 2, it will be appreciated that in some embodiments a plurality of nozzles 36 may be used.

A bank 38 of spray nozzles, in addition to the melt slurry nozzles 36, may, as illustrated, include one or more solution spray nozzles 40 that may be configured to spray liquid water or fertilizer solution recycled or recovered from other plant operations, as desired, onto the granules 34. In some embodiments, additional ammonia can be added to adjust the pH either by adding ammonia alone or in combination with one or more of water of fertilizer solution. In some embodiments, the bank 38 includes one or more steam injection nozzles 42 that may be configured to inject steam into the granulation drum 12. To account for the cooling duty to solidify the melt-slurry, embodiments of the present invention control the water, air and steam that is sprayed/injected onto the granule bed to control the moisture content while still maintaining desirable physical properties of the resulting ASN material including crush strength. In another embodiment, additional ammonia is added to the granulation drum 12, either through the spray bank 38 or in any other acceptable manner. In some embodiments, additional ammonia is added in order to adjust the pH upwards towards the product pH such that the pH at the moment of discharge from the granulation bed is substantially the same as the normal product pH. As further set forth in the Examples, the ammonia raises the pH of the solid ASN material, which may facilitate the more rapid and complete conversion of the ammonium sulfate nitrate 3:1 double salt to the ammonium sulfate nitrate 2:1 double salt.

Referring again to FIG. 1, in one exemplary embodiment, an air source 54 provides temperature and/or humidity controlled air at a desired flow rate via an air inlet 56 in order to selectively modify a rate of air flow through the granulation bed. Air is vented from the granulation drum 12 via a vent 28. An outlet 30 transports product from the granulation drum 12. In some exemplary embodiments, granulation drum 12 may further include an inlet 58 for product recycle, and a rolling seed bed in the interior of the granulation drum 12.

In some embodiments, less than about 7 wt. % of the product consists of the unreacted and underreacted ammonium nitrate or 1:3 double salt species. In some embodiments, less than about 5 wt. % or even less than about 3 wt. % of the product consists of the unreacted and underreacted ammonium nitrate or 1:3 double salt species. In one embodiment, water content is controlled such that the resulting solid ASN composition has a water content of as low as about 0.4 wt. %, as low as about 0.5 wt. %, or as low as 0.6 wt. % and as high as about 1.5 wt. %, as high as about 1.75 wt. %, or as high as about 2.0 wt. %. In other embodiments, the resulting solid ASN composition has a water content that is within any range defined between any pair of the foregoing values, such as such as about 0.4 wt. % to about 2.0 wt. %, about 0.5 wt. % to about 1.75 wt. %, or about 0.5 wt. % to about 1.5 wt. %. By controlling the water content within these ranges, ASN 2:1 double salt conversion is maximized while still maintaining the structural integrity (e.g., crush strength) of the resulting material. As used herein, water content refers to the average water content of a sample of solid ASN material, as determined via conventional gravimetric analysis, taken during or shortly after production as indicated.

As illustrated in FIG. 1, an inert fluid is provided from a fluid source 18. The inert fluid is illustratively added to the melt slurry at injection point 20A or injection point 20B. Injection point 20A is illustratively a portion of the header 24 or distributor of inlet conduit of granulator drum 12. Injection point 20B is illustratively a portion of conduit 22 positioned upstream of the header 24 or distributor. In one exemplary embodiment, the injection point 20A is an open penetration and block valve into header 24. In one exemplary embodiment, the injection point 20B is an open penetration and block valve into conduit 22. In some exemplary embodiments, injection point 20 may further comprise one or more baffles (not shown) for promoting additional mixing between the melt slurry and the inert fluid. A valve 52 is illustratively positioned between fluid source 18 and injection point 20 to control flow of the inert fluid into injection point 20.

As illustrated in FIG. 1, injection points 20A and 20B are illustratively positioned downstream of sensing and control instruments, such as pressure and/or temperature instruments 44, and flow element 46. In some embodiments, the injection of inert fluid into conduit 22 upstream of the sensing and control instruments may disrupt the measurement capability and/or physically harm one or more of the instruments.

As used herein, the term inert fluid refers to a secondary medium that is chemically inert with respect to the primary melt fluid in conduit 22, which primarily modifies the physical spray characteristics as it co-discharges from the plurality of nozzles 36 of the melt slurry in granulator 12. In one embodiment, the inert fluid is not wholly incorporated into the final granulated product, and can be reasonably expected to separate from the granulated product by remaining in a vapor state upon solidification of primary melt feed, or alternatively by evaporating at the granule bed temperature conditions to the same equilibrium condition. In some exemplary embodiments, the inert fluid is a volatile fluid having an atmospheric boiling point of about 110° C. or less. Without wishing to be held to any theory, it is believed that the inclusion of the volatile fluid produces a mixed phase droplet suspension, which increases the relative velocity of the melt slurry on exiting the nozzles 36. In one exemplary embodiment, the inert fluid is selected from the group consisting of steam, liquid water, compressed air, and inert gases such as nitrogen and argon.

In one exemplary embodiment, the inert fluid is steam. Without wishing to be held to any particular theory, at relatively low levels, it is believed that the steam will minimally compete with melt for available flow area within nozzles 36, yielding no appreciable effect. At moderate levels, the steam will increase pressure observed in conduit 26 and increase velocity of both fluids exiting nozzles 36, yielding an increased spread in spray pattern without a cooling effect. At relatively high levels, the steam will increase pressure observed in conduit 26 and increase velocity of both fluids exiting nozzles 36, yielding an erratic spread pattern without a cooling effect, and potentially preventing desired control of melt flow via valve 50.

In one exemplary embodiment, the inert fluid is liquid water. Without wishing to be held to any particular theory, at relatively low levels, it is believed that at relatively low levels, the liquid water will substantially vaporize to steam, increasing pressure and decreasing temperature observed in conduit 26 and increasing velocity of both fluids exiting nozzles 36, yielding an increased spread in spray pattern with a cooling effect. At moderate levels, the liquid water will partially vaporize to steam, increasing pressure and decreasing temperature observed in conduit 26 and increasing velocity of both fluids exiting nozzles 36, yielding an increased spread in spray pattern with a cooling effect. At relatively high levels, the liquid water will partially vaporize to steam, increasing pressure and decreasing temperature observed in conduit 26 while substantially diluting the melt feed. Increased velocity of both fluids exiting nozzles 36 are exhibited with a decrease in viscosity, yielding an increased spread in spray pattern with significant cooling effect. In one exemplary embodiment where the inert fluid is liquid water, a relatively low level of inert fluid is below about 4 wt. % based on the weight of the melt slurry, a moderate level of inert fluid is about 4 wt. % to about 15 wt. % based on the weight of the melt slurry, and a relatively high level of inert fluid is greater than about 4 wt. %, based on the weight of the melt slurry.

In one exemplary embodiment, the inert fluid is a compressed gas, such as compressed air, compressed nitrogen, or compressed argon. Without wishing to be held to any particular theory, at relatively low levels, it is believed that at relatively low levels, the compressed gas will minimally compete with melt for available flow area within nozzles 36, yielding no appreciable effect. At moderate levels, the compressed gas will increase pressure observed in conduit 26 and increase velocity of both fluids exiting nozzles 36, yielding an increased spread in spray pattern with a cooling effect. At relatively high levels, the compressed gas will increase pressure observed in conduit 26 and increase velocity of both fluids exiting nozzles 36, yielding an erratic spread pattern with a significant cooling effect, and potentially preventing desired control of melt flow via valve 50.

In some exemplary embodiments, the amount of inert fluid, based on the weight of melt slurry, is as little as 0.01 wt. %, 0.02 wt. %, 0.03 wt. %, as great as 4 wt. %, 6 wt. %, 13 wt. %, 15 wt. %, 20 wt. %, or within any range defined between any two of the foregoing values, such as 0.01 wt. % to 20 wt. %, 0.01 wt. % to 0.03 wt. %, 0.02 wt. % to 13 wt. %, 0.03 wt. % to 4 wt. %, 4 wt. % to 15 wt. %, 4 wt. % to 13 wt. %, or 4 wt. % to 20 wt. %.

As used herein, the term additive refers to a chemical modifier of the melt slurry or final product. Additives, which are typically non-volatile and wholly incorporated into the final product, are not included in the group of inert fluids. Exemplary additives include granulation aids, such as aluminum sulfate, calcium or magnesium compounds, iron sulfate, zinc salts, or many proprietary additive blends including but not limited to binder, hardening, and spreading agents. Fluids added specifically to control product pH or storage properties are also not included in the group of inert fluids.

In one exemplary embodiment, the injection of the inert fluid into the conduit 22 and/or header 24 of inlet conduit 26 provides synergistic results compared to a similar injection of melt slurry and a separate injection of the inert fluid through a separate inlet into granulation drum 12.

EXAMPLES

In one exemplary embodiment, the injection of liquid water into the header 24 of inlet conduit 26 provides synergistic results compared to a similar injection of melt slurry and a separate injection of liquid water through a separate inlet 40 into granulation drum 12. In this example, the primary melt feed is equimolar ammonium sulfate nitrate slurry at approximately 180° C., which is pre-saturated with water at atmospheric pressure of approximately 4-5 wt. %. Injection of secondary fluid liquid water into header 24 is maintained in a range of 4%-15% by weight of primary melt feed.

Without the injection of the secondary fluid liquid water, the granules exiting granulation drum 12 were typically undersized, and granulation drum 12 did not achieve sustained steady state of particle size fractions, necessitating shutdown of the unit. The weight fraction of granules exiting the granulation drum 12 retained on a +10 Tyler mesh screen was less than about 30%. In addition, the crush strength of the resulting granules was typically less than about 5 pounds per granule.

In contrast, with the injection of the 4-15 wt. % of secondary fluid, the granulation drum 12 was successfully operated at steady state on a continuous basis, and the weight fraction of granules retained on a +10 Tyler mesh screen was greater than about 60%. Additionally, the crush strength of the resulting granules was typically greater than 8 pounds per granule, to as high as 15 pounds per granule.

Without wishing to be held to any particular theory, it is believed that the injected water performs three discrete functions to modify the spray behavior: primarily, a small portion of the injected secondary fluid, <1%, is vaporized to steam providing a desired increase in melt spray pattern. Secondarily, the injected water temporarily associates with the melt to an extent not achievable without increased feed preparation pressure. Thirdly, the injected water provides a high level of targeted evaporative cooling that improves granule bed temperature control and elimination of localized hot spots. This synergistic effect results in an observed decrease in undersized fine particles (<0.5 mm) that were not successfully incorporated into a larger, target size granule of 2-3.5 mm. In both cases, where liquid water is injected in the targeted range of 4-13 wt. % via nozzle 40 or inlet 20, product granules exiting the granulator device exhibit moisture levels less than about 2.0 wt. %, and more preferably less than about 1.5 wt. %, which is less than the primary feed composition (4-5 wt. %), indicating that no additional water was incorporated into the granule across this process.

While this invention has been described as relative to exemplary designs, the present invention may be further modified within the spirit and scope of this disclosure. Further, this application is intended to cover such departures from the present disclosure as come within known or customary practice in the art to which this invention pertains.

What is claimed is:

1. A method of producing a granulated fertilizer product comprising:
   providing a melt slurry;
   mixing an inert fluid with the melt slurry to form a mixture;
   spraying the mixture in a granulation bed of a granulation drum; and
   solidifying the melt slurry in the granulation drum to form a granulated fertilizer product, and
   wherein said mixing step further comprises injecting the inert fluid into the melt slurry at an injection location in a conduit of the granulation drum.

2. The method of claim 1, wherein the melt slurry comprises ammonium nitrate and ammonium sulfate, and wherein the product includes a double salt of ammonium nitrate and ammonium sulfate having the formula $NH_4SO_4 \cdot 2(NH_4NO_3)$.

3. The method of claim 2, wherein at least 50 wt. % of the product consists of the $NH_4SO_4 \cdot 2(NH_4NO_3)$ double salt.

4. The method of claim 2, wherein less than about 7 wt. % of the product consists of unreacted and underreacted ammonium nitrate and the $NH_4SO_4 \cdot 3(NH_4NO_3)$ double salt.

5. The method of claim 2, wherein the melt slurry comprises a molar ratio of ammonium nitrate to ammonium sulfate of about 0.9:1 to about 1.1:1.

6. The method of claim 2, wherein the product comprises granules having a water content from about 0.4 wt. % to about 2.0 wt. %.

7. The method of claim 2, wherein the granulation bed is maintained at a temperature from about 80° C. to about 120° C.

8. The method of claim 1, wherein the inert fluid is a volatile fluid and the granulated fertilizer product does not wholly include the volatile fluid.

9. The method of claim 1, wherein the inert fluid is selected from the group consisting of: steam, liquid water, air, nitrogen, and argon.

10. The method of claim 1, wherein the inert fluid is steam.

11. The method of claim 1, wherein the inert fluid is liquid water.

12. The method of claim 1, wherein the inert fluid has an atmospheric boiling point of about 110° C. or less.

13. The method of claim 1, wherein the inert fluid is provided at an amount, based on the weight of the melt slurry, of from about 0.01 wt. % to ratio to about 0.03 wt. %.

14. The method of claim 1, wherein the inert fluid is provided at an amount, based on the weight of the melt slurry, of from about 4 wt. % to ratio to about 20 wt. %.

15. The method of claim 1, further comprising measuring at least one property of the melt slurry with at least one instrument, wherein said mixing step is performed after said measuring step.

16. The method of claim 15, wherein said measuring includes measuring at least one property selected from the group consisting of flow rate, pressure, and temperature.

17. The method of claim 1, wherein the injection location is a header or a distributor of the granulation drum.

18. The method of claim 1, wherein said mixing is performed by injecting the inert fluid into the melt slurry at the injection location in the conduit prior to entering the granulation drum.

19. The method of claim 1, wherein the injection location is positioned proximate a coupling between the conduit and the granulation drum.

20. A method of producing a granulated fertilizer product in a granulation drum, the method comprising:
   providing a melt slurry;
   mixing an inert fluid with the melt slurry to form a mixture by injecting the inert fluid into the melt slurry at an injection point proximate a coupling between a conduit of the granulation drum and the granulation drum;
   spraying the mixture in a granulation bed of the granulation drum; and
   solidifying the melt slurry in the granulation drum to form a granulated fertilizer product.

* * * * *